United States Patent [19]

Generoli et al.

[11] Patent Number: 5,397,244
[45] Date of Patent: Mar. 14, 1995

[54] PRELOAD RELEASE MECHANISM

[75] Inventors: Robert M. Generoli, Huntington Beach; Harry J. Young, Westminster, both of Calif.

[73] Assignee: The United States of America as represented by the Administrator of the National Aeronautics and Space Administration, Washington, D.C.

[21] Appl. No.: 230,571

[22] Filed: Apr. 20, 1994

[51] Int. Cl.⁶ .......................................... H01R 13/629
[52] U.S. Cl. ............................................. 439/248
[58] Field of Search ............................. 439/246–252

[56] References Cited

U.S. PATENT DOCUMENTS

| | | | |
|---|---|---|---|
| 3,781,039 | 12/1973 | Locke et al. | 285/1 |
| 4,789,351 | 12/1988 | Fisher, Jr. et al. | 439/248 |
| 4,842,537 | 6/1989 | Villiers | 439/246 |
| 4,846,714 | 7/1989 | Welsby et al. | 439/348 |
| 5,071,364 | 12/1991 | Bourgie | 439/248 |
| 5,120,243 | 6/1992 | Mee | 439/364 |
| 5,213,532 | 5/1993 | Mee | 439/364 |

FOREIGN PATENT DOCUMENTS 1455182 11/1976 United Kingdom ................ 439/248

*Primary Examiner*—Gary F. Paumen
*Attorney, Agent, or Firm*—Edwin K. Fein; Hardie R. Barr; Guy M. Miller

[57] ABSTRACT

A preload release mechanism comprising a preload spring assembly (26) adapted to apply a preload to a first connector member (16) which is mounted on a support structure (14) and adapted for connection with a second connector member on an object (10). The assembly (26) comprises telescoped bushings (28,29) and a preload spring (25). A tubular shaft (41) extends through the spring assembly (26) and openings in the first connector member and support structure (14), on which it is clamped. A plunger rod (51) in the shaft (41) is provided with a tip end (52) and a recess in the rod near the other end thereof. A retainer (55) precludes passage of the rod (51) through the shaft in one direction and an end cap (62) closes the bore of the shaft at the other end and provides a shoulder which extends radially of the shaft. A plunger return spring (61) biases the plunger rod against the plunger retainer with the plunger tip protruding from the shaft and a spring assembly return spring (63) engages at its ends the shoulder (62a) of the end cap and one end of the spring assembly (26). Detents (70) received in lateral openings in the tubular shaft (41) are held captive by the plunger rod and one end of the spring assembly (26) to lock the spring assembly (26) on the tubular shaft and apply a preload to the first connector member. Upon completion of the connection, detents (71) and spring assembly (26) are released by plunger contact with the object to be connected, thereby releasing the preload while the connection is maintained.

8 Claims, 4 Drawing Sheets

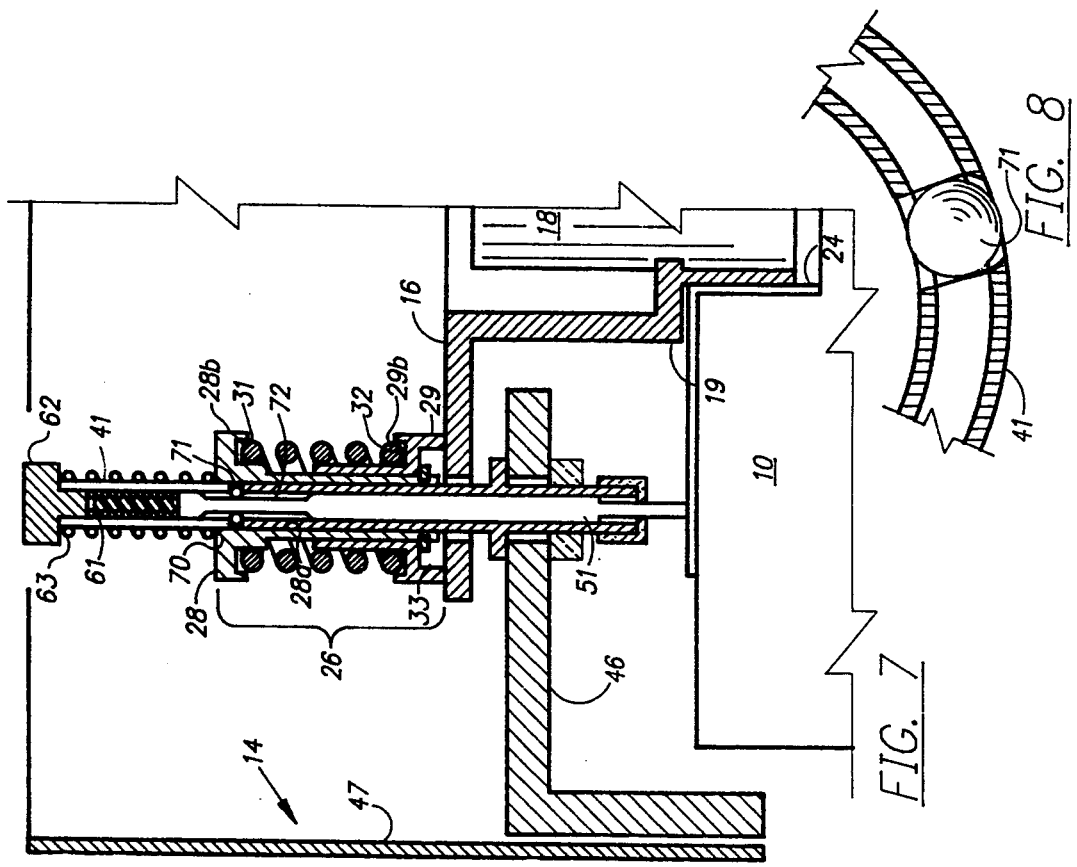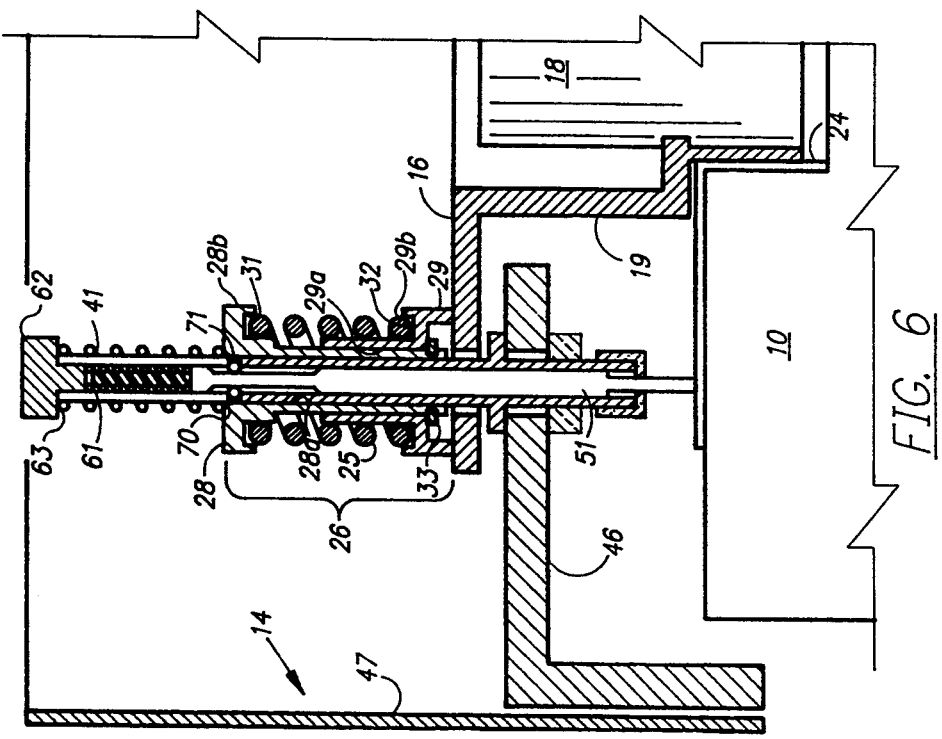

PRELOAD RELEASE MECHANISM

ORIGIN OF THE INVENTION

The invention described herein was made in the performance of work under a NASA contract and is subject to the provisions of Section 305 of the National Aeronautics and Space Act of 1958, Public Law 85-568 (72 Star. 435; 42 U.S.C. 2457).

FIELD OF THE INVENTION

The invention relates generally to connectors and devices in general which require an application of spring force in operation and a subsequent release of the spring force for utilitarian purposes and more particularly to a "blind-mated" connector of the type having a base plate member fixed to a first structure such as an avionics box and having receptacles provided therein which are adapted to receive male plugs or pins provided on a connector plate member fixed on a second structure to be joined thereto, and wherein the connector plate member is mounted on preload compression springs.

BACKGROUND OF THE INVENTION

In an effort to improve the volumetric efficiency of avionics box designs and their mounting structure, the avionics electronic industries have developed a connector commonly referred to as a "blind-mated" connector. In such design, a base plate member with male plugs or pins fixed on one side thereof is mounted to a support structure which is intended to support the avionics box. A plurality of receptacles are provided in a connector plate member on the rear of the avionics box at locations suited for reception of the male plugs as the box is guided into place by an appropriate guide means. In order to allow for tolerance build-up and to insure complete mating of the connector plugs and receptacles, the connector plate member is mounted on one or more compression springs which are preloaded to a combined force greater than that which is necessary to overcome the friction force encountered in the mating of the connector pins and receptacles. The connector plate member is mounted and positioned such that, with tolerances falling to one side of the connection, the preload compression springs will just begin to compress under their preload length as the connector pins and receptacles become fully engaged. Also, the compression springs are allowed a degree of extension travel which is sufficient to accommodate a tolerance stack-up to the other side of the connection.

Due to the large forces required to mate some connectors, which can be as high as 350 lbs. or more for some connectors, the spring preload must be quite high to insure full mating. In the course of accommodating tolerance stack-ups, the load can be as much as double that required for a tolerance-free connection, thereby leading to a requirement for individual spring forces of up to 85 lbs. for some connectors. In such conventional designs, these spring forces are applied to the structural supports so long as the avionics box remains installed, even though the preload is not needed once the connectors are fully engaged. A result is that the constant application of the preload has significant impact on the connector support requirements in terms of increased stiffness, strength, and ultimately, weight. Furthermore, when several avionics boxes share a common support structure, the combined forces from their preload springs can be very significant, resulting in additional structure and more severe weight impacts.

In U.S. Pat. No. 4,789,351 there is shown a blind-mated connector wherein the jack half of a plug and jack connection is spring biased to accommodate tolerance variations. U.S. Pat. No. 4,846,714 shows a quick disconnect connector wherein a spring biases a male member into connection with a female member and releasable locking jaws are employed to lock the members together. In U.S. Pat. No. 5,213,532 there is shown a lever system for aligning a load item with respect to a support structure for connection therewith and the application of a preload to the connection interface. U.S. Pat. No. 3,781,039 shows two parts of a coupling retained in coupled relationship by ball detents held captive in one part and urged radially inward into a recess on the external surface of the other part by a spring biased sleeve.

However, it is to be noted that in the patented devices cited above, the loads applied by compressive springs are maintained so long as the connection is in effect.

SUMMARY OF THE INVENTION

The invention is a preload release mechanism for releasing a preload applied to a connector member in a connection. The mechanism includes a preload spring assembly which comprises a pair of telescopically related bushings and a compressive preload spring mounted on the bushings to apply a force which tends to separate the bushings and lengthen the preload spring assembly. A tubular shaft extends through the bushings of the preload spring assembly and aligned openings in a connector plate and a flange on the support structure. The shaft is clamped in fixed position on the support structure flange and an end cap closes one end of the shaft. A plunger rod with a plunger tip is slidably mounted in the tubular shaft. A plunger retainer is affixed to one end of the tubular shaft whereby the plunger tip extends beyond one end of the tubular shaft and the plunger retainer although the plunger is retained in the tubular shaft.

A compressed plunger return spring located in the bore of the tubular shaft between the end cap and one end of the plunger urges the plunger into engagement with the plunger retainer on to the end of the tubular shaft opposite its capped end. A preload spring assembly return spring is sleeved on the tubular shaft with one end abutting the end cap and its other end abutting one end of the preload spring assembly. A plurality of ball detents received in lateral openings through the walls of the tubular shaft are engaged by the side of the plunger rod and one end of the preload spring assembly to thereby lock the preload spring assembly in fixed position on the tubular shaft and in abutting engagement with the connector plate. The preload applied to the connector is determined by the telescoped length of the preload spring assembly and the compressive force on the preload spring. A recess, provided by a reduced diameter portion of the plunger rod, allows the detents to drop into the recess when, upon completion of the connection, the plunger is depressed by contact of the plunger tip with the object to be connected by an amount sufficient to position the recessed portion of the plunger adjacent the ball detents. The dropping of the ball detents thereby releases the preload spring assembly for expanding telescopic movement on the tubular shaft and thereby releases the preload.

BRIEF DESCRIPTION OF THE DRAWINGS

FIG. 6 is a view similar to FIG. 5 but showing the release of the preload spring assembly by the plunger as the avionics box moves to its installed position;

FIG. 7 shows the preload spring assembly of the invention moved a distance beyond the locked position relative to the plunger on which it is mounted to accommodate installation of avionics boxes which fall to the long side of the tolerance range; and FIG. 8 is an enlarged fragmentary sectional view showing an actuator ball detent seated in a lateral opening in a tubular shaft component of the preload release mechanism of the invention.

DETAILED DESCRIPTION OF THE INVENTION

Figure 1:
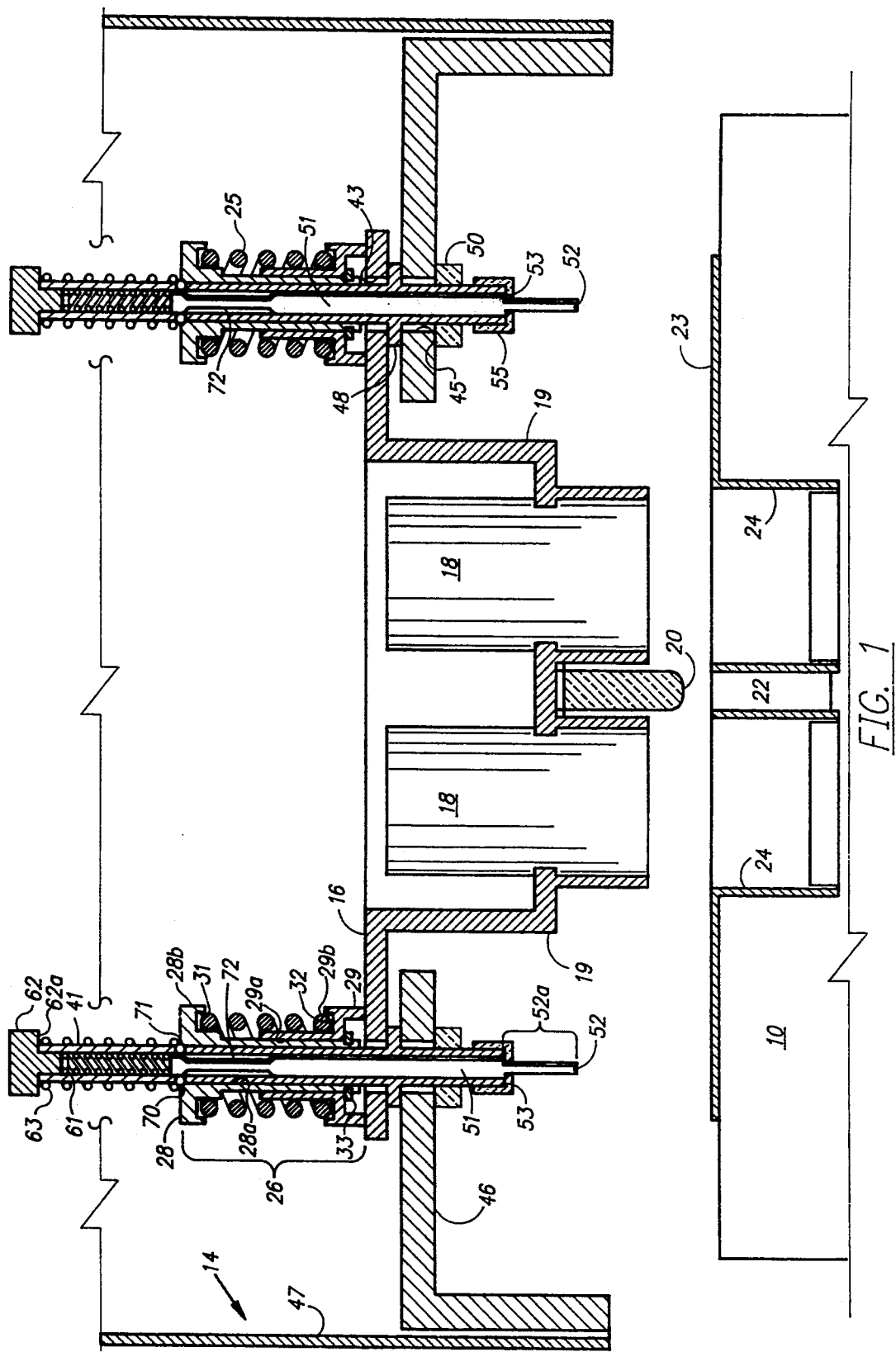
FIG. 1 is a partly sectioned view showing an avionics box in its approach to a connector plate mounted to a pair of preloaded compression springs, each if which is incorporated in a preload release mechanism in accordance with the invention.

Referring more particularly to FIG. 1, there is shown an avionics box 10, and a connector assembly 12 for connecting the avionics box to a supporting structure 14. The connector assembly 12 comprises a connector plate 16 to which a pair of male plugs 18 are mounted on one side thereof. The plugs 18 are secured to the plate 16 by brackets 19 but could be integrally formed with the plate 16 or fixed thereto by alternative means such as welding or the like. The plate 16 is also provided with a guide pin 20, integrally formed therewith, and located between the male plugs 18. The guide pin 20 is of greater length than a plug 18 and is adapted to mate with an alignment socket 22 provided on the rear face 23 of the avionics box. Typically, the guide pin is of circular cylinder configuration with a rounded end to facilitate its entry into the socket 22 as the avionics box and the connector plate 16 are moved towards one another as by a remote manipulator mechanism. As the guide pin 20 enters the socket 22, it also serves to guide the male plugs 18 into receptacles 24 provided on the rear face of the avionics box.

To take into account the tolerance build-up in the connector structures and to insure complete mating of the plugs and receptacles, the connector plate 16 is mounted on preloaded compression springs 25 which provide a combined force greater than that needed to overcome the friction force encountered in the mating of the connector plugs 18 with the receptacles 24. Each spring 25 is incorporated in a preloaded spring assembly 26, to be hereinafter described.

In many installations, several avionics boxes must be mounted to a common support structure. Accordingly the connector plate 16 or a plurality of connection plates 16 may be designed with a large number of male plugs for mating with a correspondingly large number of receptacles in the avionics boxes to accommodate the connection of the several avionics boxes to the support structure. Typically, a connector plate with a pair of compression springs is sufficient to accommodate connection of a single avionics box.

Figure 2:
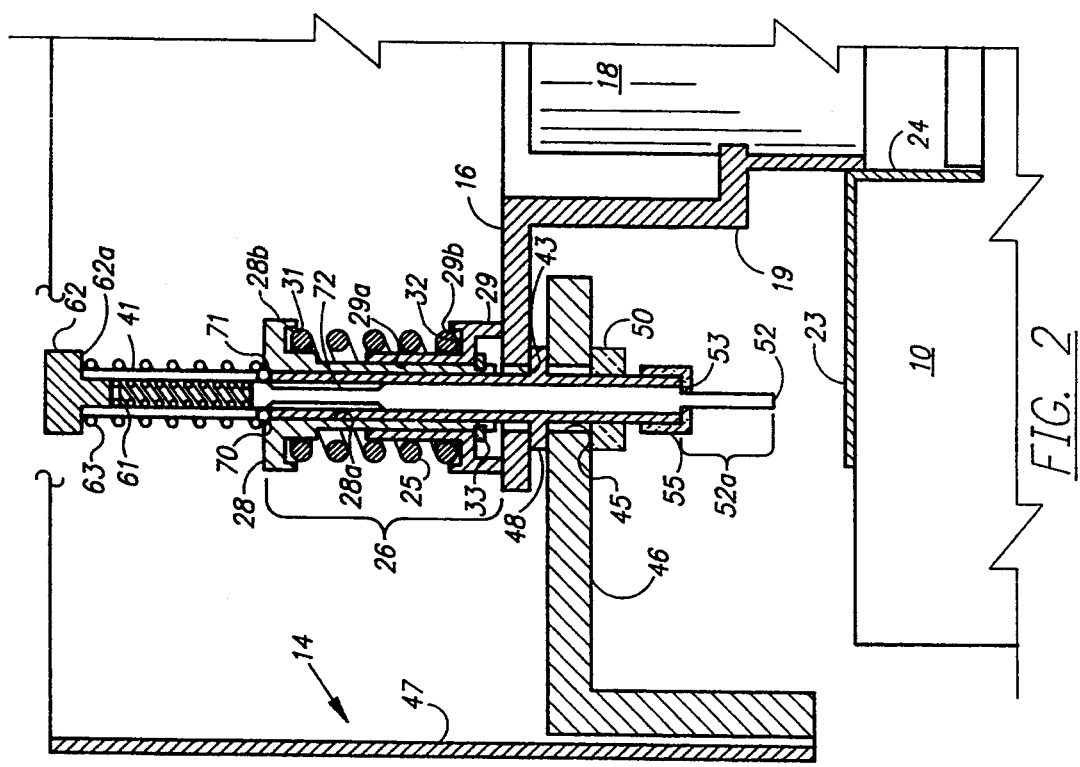
FIG. 2 is a sectional view similar to FIG. 1, but showing only one of the connecter compression springs and its preload release mechanism as the two connector portions begin to mate.

In FIG. 2, a single avionics box 10 is shown in an aligned approach to the connector plate 16, which is fixed to the support structure 14. A coiled compression spring 25 is shown positioned and captured by a pair of bushings, comprising an inner bushing 28 and an outer bushing 29. The bushing 28 is a tubular member having an internal axial bore 28a and provided with an external annular radial flange 28b at one end. The outer bushing 29 is also a tubular member with an internal bore 29a and provided at one end with an external annular radial flange 29b. The internal diameter of the bore 29a of bushing 29 is slightly larger than the external diameter of the elongate tubular portion 28 of the inner bushing 28 which is received therein.

The annular surface of the bushing flange 28b which faces toward the flange 29b is provided with an annular groove 31 in coaxial relation with the axis of the tubular bushing 28. In like manner, the annular surface of the bushing flange 29b which faces toward the flange 28b is provided with an annular groove 32, also coaxial with the axes of the two sleeved tubular bushings. One end of the coiled spring 25 is seated in the groove 31 and the other end of the coiled spring 25 is seated in the groove 32 such that the spring 25 is in sleeved relation to the elongate portion of the bushing 29 and in coaxial relation with the tubular bushings 28, 29.

The inner bushing 28 is also provided with a retainer in the form of a resilient split ring 33 which seats in an external annular groove formed adjacent the opposite end 38 of the bushing, remote from the flange 28b. An annular shoulder of the flange 29b abuts the retainer ring 33 such that the bushing 29 is held thereagainst by the coiled spring 25 which is held in compression between the flanges 28b and 29b. The coiled spring 25 is thus provided with a preload which is predetermined by the spring characteristics and the spacing between the flanges 28b and 29b.

The bushings 28, 29 and the compression spring 25 comprise the preload spring assembly 26, which is slidably sleeved onto an elongated tubular shaft 41 which extends completely through the bore 28a of the inner bushing 28 and the preload spring assembly 26. The tubular shaft 41 also extends through an opening 43 in the connector plate 16 and a similar opening 45 in a flange 46 which extends inwardly from a side wall 47 of the support structure 14 and in parallel relationship to the connector plate 16. The tubular shaft 41 is also provided with an external radial flange 48, which, in assembly and mounting of the connector plate 16 to the support structure 14, is positioned between the support structure flange 46 and the connector plate 16. A retainer nut 50, which is threaded onto an externally threaded end portion of the tubular shaft 41 serves to clamp the tubular shaft flange 48 against the flange 46 of the support structure 14 and thereby secure the tubular shaft 41 to the support structure flange 46.

A release mechanism is also provided which is operated by the action of a rod-like plunger 51 slidably received in the bore of the tubular shaft 41. At one end, the external diameter of the plunger 51 is reduced which provides a reduced diameter portion 52a with a plunger tip 52 and a radially extending annular shoulder 53 at the junction of the different diameter portions of the plunger 51.

A plunger retainer 55 in the form of a cylindrical sleeve with an internal radial flange at one end and threads formed on the inner cylindrical wall thereof, is threaded onto the external threads on the tubular shaft 41 which also receive the retaining nut 50. The plunger retainer 55 is threaded onto the shaft 41 so that the flange of the plunger retainer 55 engages the end of the shaft 41 and also the shoulder 53 of the plunger. The plunger 51 is held against the flange of the plunger retainer 55 by a coiled spring 61 which is housed within the bore of the tubular shaft 41 with one end of the spring 61 in abutting engagement with one end of the plunger 51 and the other end of the spring 61 is in abutting engagement with an end cap 62. The end cap 62 has a reduced diameter portion which is threaded into the internally threaded end portion of the tubular shaft 41 and a larger diameter portion which abuts the end of the shaft 41. The coiled spring 61 which is designated the plunger return spring, is compressed between the end cap 62 and the plunger 51 so that it imparts a force on the plunger 51 to urge it against the plunger retainer 55.

The enlarged portion of end cap 62 which abuts the end of the tubular shaft 41, is provided with a diameter which is larger than the external diameter of the tubular shaft 41 and thereby provides an annular shoulder 62a which extends radially beyond the shaft 41 in coaxial relation therewith. A third coiled spring 63 is sleeved about the tubular shaft 41 with one end in abutting engagement with the shoulder 62a of end cap 62 and the other end of the spring in abutting engagement with the external annular end surface of the bushing 28 of the preload spring assembly 26. The spring 63, designated the preload assembly return spring, is placed in compression by the end cap 62 and urges the preload spring assembly 26 against the connector plate 16.

It is also to be seen in FIG. 2 that a plurality of two or more actuator balls 71 are mounted in the cylindrical wall of the tubular shaft 41 and seat in holes or lateral openings 73 formed through the wall of the shaft 41 and in circular array about the axis of the shaft 41. Each of the actuators balls 71 has a diameter which exceeds the thickness of the cylindrical wall of the tubular shaft 41 and engages an annular bevelled shoulder 70 formed in the end of the cylindrical inner wall of the bushing 28. The balls 71 are prevented from falling into the tubular shaft 41 by the plunger 51. The lateral openings 73, as shown in FIG. 8, are smaller at their opening in the outer wall of the tubular shaft 41, being less than the diameter of a ball 71, thereby preventing a ball from moving radially outward through the wall of the shaft. The balls 71 thereby serve to lock the preload spring assembly 26 in position on the shaft 41 so the bushing 28 cannot move past the balls 71 towards the end cap 62.

Referring to FIG. 2, it will be seen that as the connector plugs and receptacle begin to mate, the preload spring assembly remains locked in place on the shaft 41, providing the necessary support for the connector plate 16. It will also be seen in FIG. 3 that the tip end 52 of the plunger is positioned such that it will make contact with the rear surface 23 of the avionics box approximately 0.03 to 0.06 inches before the connector assembly plugs and receptacles become fully engaged. It is also to be seen in FIG. 4 that the connector plate 16, itself, is positioned such that full connector engagement of a plug and receptacle is achieved approximately one-eighth inch before the avionics box 10 contacts the mounting structure which carries the plugs 18.

Figure 5:
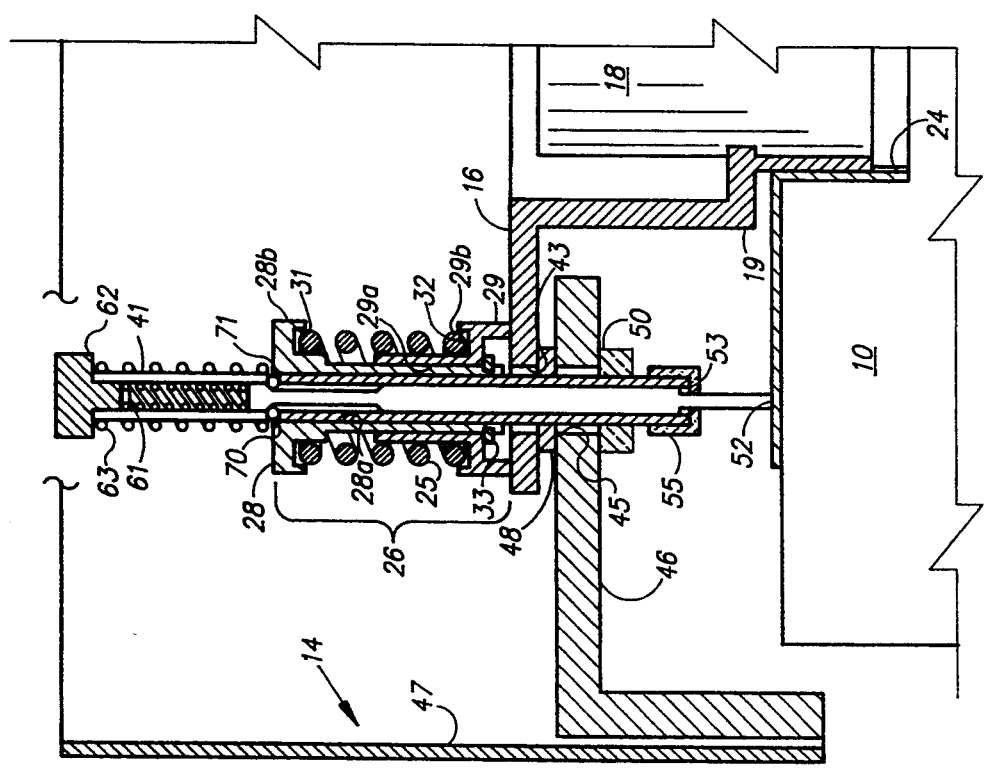
FIG. 5 is a view similar to FIG. 4 but showing the relative orientation of the connector plate and the preload release mechanism after the avionics box travels the final one-eighth inch to its installed position.

As the avionics box 10 and the mounting structure close the final separation gap of approximately one-eighth inch, which could be more or less, to the installed position for the avionics box, the preload spring 25 compresses further and the plunger 51 is depressed slightly as shown in FIG. 5, thereby allowing the locking balls to move inward, falling and being urged against a reduced diameter portion 72 of the plunger 51, which forms an annular recess in the plunger shaft as shown in FIG. 6. In this condition, the balls no longer engage the bushing 28 and the preload spring assembly 26 is released, which in turn releases the preload.

Some avionics boxes may be of such height as to fall to the long side of the tolerance range and these are accommodated by travel of the preload spring assembly 26 beyond its original locked position on the shaft 41, such as shown in FIG. 7.

It will therefore be seen that once the preload spring assembly is released, the only force which remains applies to the connector support structure is the relatively fewer pounds of spring force applied by the preload spring assembly return spring. Consequently, the supporting structure need only be sized to handle the load applied by each connector for an avionics box individually, thereby allowing the structure to be significantly reduced in size and weight as compared to a connection where the total preload of all the compression springs is maintained.

Figure 3:
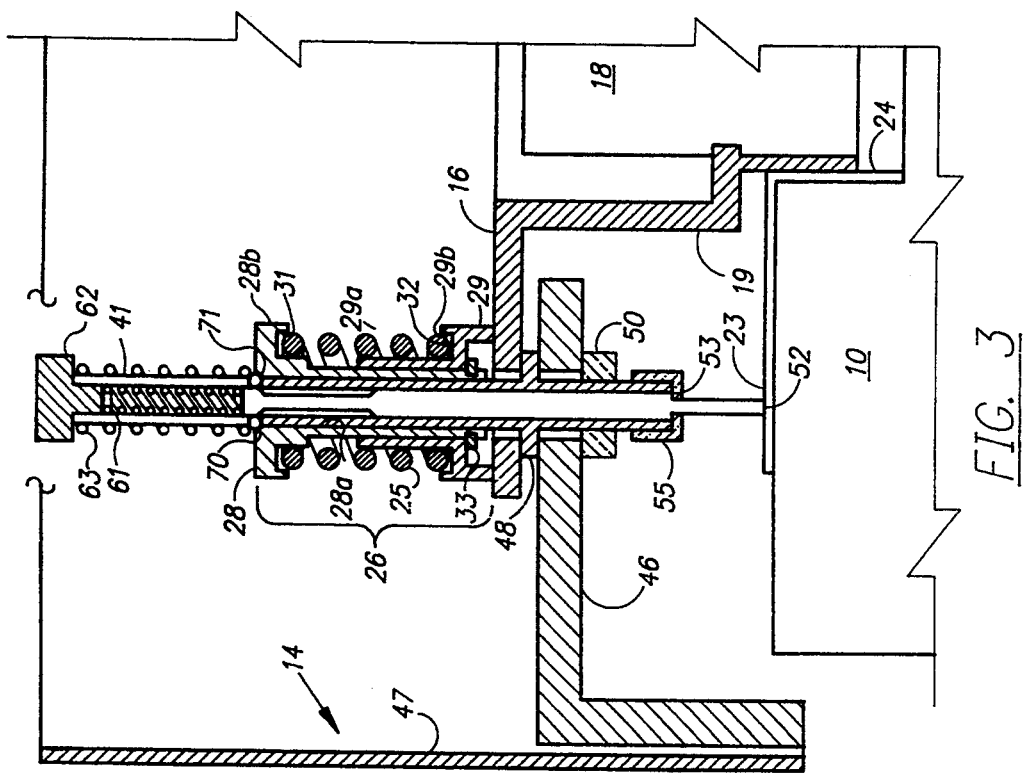
FIG. 3 is a view similar to FIG. 2 but showing the end of a plunger in the preload release mechanism as the plunger makes initial contact with the avionics box.
Figure 4:
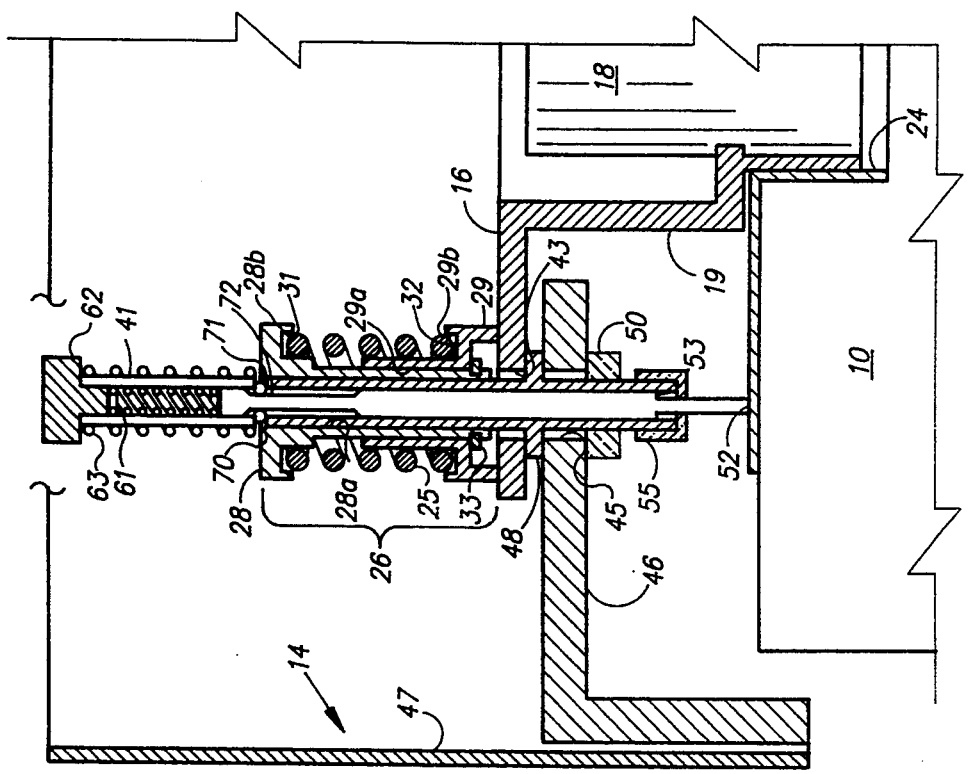
FIG. 4 is a view similar to FIG. 3 but showing full connector engagement occurring approximately one-eighth inch before the avionics box contacts the mounting structure.

It is also to be seen, that if the avionics box is removed from its installation, the return springs 61 and 63 operate to return the preload spring assembly and the plunger to the original locked position as shown in FIG. 3.

It is therefore to be seen that a novel connector-preload release mechanism is disclosed herein which is designed to provide the spring preload and travel needed to insure full connector mating within the full tolerance zone of the connections and has the further advantage that, once the connector is fully mated, the spring preload is then released. Since each connector applies the spring loads to the support structure only while the connector is being mated, the large collective loading and massive structure needed to cope with it, is avoided.

The invention, comprising the novel preload release mechanism, described herein, can be incorporated in any application where "blind mate" electrical connectors are used. Other possible uses are for blind fittings, optical fiber connections or any connector application where it is advantageous to relieve spring preload when it is no longer needed.

It is also to be understood that the foregoing description of the invention has been presented for purposes of illustration and explanation and is not intended to limit the invention to the precise forms disclosed. For example, the major components of the preload release mechanism described herein, such as the bushings 28, 29, tubular shaft 41 and plunger 51 could have transverse cross sections of other than circular shape, such as square, triangular or ovoid. Similarly, the springs need not be of the coil type and could also be made of various materials such as metal or elastomers.

It would also be possible to configure the mechanism to utilize tension springs instead of compression springs and to use quick release systems which include cams, split rings, or sliding plates instead of ball detents.

It is to be appreciated therefore that various material and structural changes may be made by those skilled in the art without departing from the spirit of the invention.

We claim:

1. A preload release mechanism comprising:

a preload spring assembly adapted to apply a preload to a connector member mounted on a support structure, said connector member being adapted for blind mated connection with a second connector member affixed to an object to be mounted to said support structure, said preload spring assembly comprising a pair of cylindrical bushings arranged in sleeved telescopic relation with the innermost bushing having an axial opening therethrough which defines an opening through said preload spring assembly and a coiled compressive preload spring arranged in sleeved relation to said telescoped bushings;

means for mounting said compressive preload spring in compressed condition on the telescoped bushings whereby the compressive spring applies a biasing force urging the separation of the telescoped bushings;

a tubular shaft extending through said opening through the preload spring assembly and through aligned openings provided in the connector plate member and said supporting structure, said tubular shaft having a plurality of lateral openings extending through the wall of the shaft and each adapted to receive an actuator detent therein;

means for clamping said tubular shaft in fixed position on said support structure;

a plunger in the form of a plunger rod slidably mounted in said tubular shaft, said plunger rod having an annular shoulder formed near one end thereof by a first reduced diameter portion which forms a tip end of the plunger, said plunger rod having a second reduced diameter portion forming an annular recess in the plunger rod near the other end thereof;

a plunger retainer fixed to one end of said tubular shaft and having an internal annular flange extending radially and providing an annular stop surface adapted to be engaged by said plunger rod shoulder and thereby preclude passage of the plunger rod through said shaft in one axial direction of said shaft;

an end cap fitted on the end of the tubular shaft opposite said tip end and closing the bore of the shaft, said end cap having an external annular flange providing an annular shoulder abutting the end of the tubular shaft and radially extending beyond the external longitudinal surface of the shaft;

a plunger return spring located in the bore of said tubular shaft in compressed condition therein with one end of the plunger return spring abutting said end cap and the other end of said return spring abutting one end of the plunger rod to thereby bias the plunger rod against the plunger rod retainer;

a preload spring assembly return spring mounted in sleeved relation to said tubular shaft with one end thereof abutting said cap shoulder and the other end thereof abutting one end of the preload spring assembly; and a plurality of actuator detents received in said plurality of lateral openings in the tubular shaft, each of said detents being held captive in a different one of said lateral openings by engagement with the side surface of the rod intermediate said recess and the end of the rod engaged by the plunger return spring and by engagement with an annular end surface formed about the axial opening through the inner bushing, said detents locking the preload spring assembly in position on said tubular shaft whereby the preload spring assembly applies a preload to the connector member whereby upon completion of the connection a contact of the plunger tip with said object to be connected with a force sufficient to depress the plunger rod causes the detents to move against the recessed portion of the plunger and to release the preload spring assembly for movement on the tubular shaft in counteraction to the preload spring assembly return spring and thereby release said preload.

2. A preload release mechanism as set forth in claim 1 wherein said detents are ball detents.

3. A preload release mechanism as set forth in claim 1 wherein said return springs are coiled springs of lesser compressive strength then said preload spring.

4. A preload release mechanism comprising:

a preload spring assembly adapted to apply a preload to a first connector member mounted on a support structure, said connector member being adapted for blind mated connection with a second connector member affixed to an object to be mounted to said support structure, said preload spring assembly comprising a pair of cylindrical bushings arranged in sleeved telescopic relation with the innermost bushing having an axial opening therethrough which defines an opening through said preload spring assembly and a coiled compressive preload spring arranged in sleeved relation to said telescoped bushings;

means for mounting said compressive preload spring in compressed condition on the telescoped bushings whereby the compressive spring applies a biasing force urging the separation of the telescoped bushings;

a tubular shaft extending through said opening through the preload spring assembly and through aligned openings provided in the connector member and said supporting structure, said tubular shaft having a plurality of lateral openings extending through the wall of the shaft and each adapted to receive an actuator detent therein;

means for clamping said tubular shaft on said support structure;

a plunger in the form of a plunger rod slidably mounted in said tubular shaft, said plunger rod having an annular shoulder formed near one end thereof by a first reduced diameter portion which forms a tip end of the plunger, said plunger rod having a second reduced diameter portion forming an annular recess in the plunger rod near the other end thereof which annular recess is positioned adjacent said lateral openings upon depression of the plunger tip;

a retainer means fixed to one end of said tubular shaft for precluding passage of the rod through said shaft in one axial direction of said shaft;

an end cap fitted on the end of the tubular shaft opposite said tip end and closing the bore of the shaft, said end cap having an external flange providing a cap shoulder abutting the end of the tubular shaft and radially extending beyond the external longitudinal surface of the shaft;

a plunger return spring located in the bore of said tubular shaft in compressed condition therein to thereby bias the plunger rod against the plunger rod retainer; and a plurality of detents received in said plurality of lateral openings in the tubular shaft, each of said detents being held captive in a different one of said lateral openings by the side surface of the plunger rod, said detents locking the preload spring assembly in position on said tubular shaft such that the preload spring assembly applies a preload to said first connector member, said preload spring assembly and said preload being releasable upon completion of the connection by depression of the plunger rod and release of the detents to said recess upon contact of the plunger tip with said object to be connected.

5. A preload release mechanism as set forth in claim 4 further including a preload assembly return spring mounted in sleeved relation to said tubular shaft with one end thereof abutting said cap shoulder and the other end thereof abutting one end of the preload spring assembly, said preload assembly return spring acting to control movement of the preload spring assembly when released by said detents.

6. A preload release mechanism as set forth in claim 5 wherein said detents are ball detents.

7. A preload release mechanism as set forth in claim 5 wherein said return springs are coiled springs, each characterized by a smaller spring constant than said preload spring.

8. A preload release mechanism comprising:

a preload spring assembly adapted to apply a preload to a first connector member mounted on a support structure, said connector member being adapted for connection with a second connector member affixed to an object to be mounted to said support structure, said preload spring assembly comprising a pair of bushings arranged in sleeved telescopic relation with the innermost bushing having an axial opening therethrough which defines an opening through said preload spring assembly and a preload spring arranged in sleeved relation to said telescoped bushings;

means for mounting said preload spring on the telescoped bushings whereby the spring applies a biasing force urging the separation of the telescoped bushings;

a tubular shaft extending through said opening through the preload spring assembly and through aligned openings provided in the connector member and said supporting structure, said tubular shaft having at least one lateral opening extending through the wall of the shaft and where each said opening is adapted to receive a detent therein;

means for clamping said tubular shaft on said support structure;

a plunger in the form of a plunger rod slidably mounted in said tubular shaft, said plunger rod having an annular shoulder formed near one end thereof by a first reduced diameter portion which forms a tip end of the plunger, said plunger rod having a second reduced diameter portion forming a recess in the plunger rod near the other end thereof which recess is positioned adjacent each said lateral opening upon depression of the plunger tip;

a retainer means fixed to one end of said tubular shaft for precluding passage of the rod through said shaft in one axial direction of said shaft;

an end cap fitted on the end of the tubular shaft opposite said tip end and closing the bore of the shaft, said end cap having an external flange providing a cap shoulder abutting the end of the tubular shaft and radially extending beyond the external longitudinal surface of the shaft;

a plunger return spring located in the bore of said tubular shaft in stressed condition therein to thereby bias the plunger rod against the plunger rod retainer; and a releasable detent received in each said lateral opening in the tubular shaft, each of said detents being held captive in a different one of said lateral openings by the side surface of the plunger rod, said detents locking the preload spring assembly in position on said tubular shaft such that the preload spring assembly applies a preload to said first connector member, said preload spring assembly and said preload being releasable upon completion of the connection by depression of the plunger rod and release of the detents to said recess upon contact of the plunger tip with said object to be connected.

* * * * *